(12) United States Patent
Yang et al.

(10) Patent No.: US 10,095,389 B2
(45) Date of Patent: Oct. 9, 2018

(54) GESTURE-BASED ON-CHART DATA FILTERING

(71) Applicants: Rui Yang, Shanghai (CN); Yingyu Xie, Shanghai (CN); Zimo Zhang, Shanghai (CN); Youdong Miao, Shanghai (CN); Meng Chen, PingXiang (CN)

(72) Inventors: Rui Yang, Shanghai (CN); Yingyu Xie, Shanghai (CN); Zimo Zhang, Shanghai (CN); Youdong Miao, Shanghai (CN); Meng Chen, PingXiang (CN)

(73) Assignee: Business Objects Software Ltd., Dublin (IE)

( * ) Notice: Subject to any disclaimer, the term of this patent is extended or adjusted under 35 U.S.C. 154(b) by 425 days.

(21) Appl. No.: 14/466,095

(22) Filed: Aug. 22, 2014

(65) Prior Publication Data
US 2016/0055232 A1 Feb. 25, 2016

(51) Int. Cl.
*G06F 17/30* (2006.01)
*G06F 3/0484* (2013.01)
*G06T 11/20* (2006.01)
*G06F 3/0482* (2013.01)
*G06F 3/0488* (2013.01)

(52) U.S. Cl.
CPC ........ *G06F 3/04842* (2013.01); *G06F 3/0482* (2013.01); *G06F 3/04883* (2013.01); *G06F 17/30398* (2013.01); *G06T 11/206* (2013.01)

(58) Field of Classification Search
CPC ......... G06F 17/30572; G06F 17/30905; G06F 17/30991; G06F 17/30716

USPC .......................................... 707/740; 715/863
See application file for complete search history.

(56) References Cited

U.S. PATENT DOCUMENTS

| | | | |
|---|---|---|---|
| 7,139,766 B2 * | 11/2006 | Thomson | G06F 17/30539 |
| 7,369,127 B1 * | 5/2008 | Hull | G06T 11/206 |
| | | | 345/440 |
| 7,788,606 B2 | 8/2010 | Patel et al. | |
| 7,922,098 B1 * | 4/2011 | Ma | G06Q 20/042 |
| | | | 235/379 |
| 8,457,353 B2 | 6/2013 | Reville et al. | |
| 8,527,909 B1 | 9/2013 | Mullany | |
| 8,583,664 B2 | 11/2013 | Weir et al. | |
| 8,793,701 B2 * | 7/2014 | Engrand | G06Q 10/10 |
| | | | 705/1.1 |
| 8,957,915 B1 * | 2/2015 | Chalasani | G09G 5/377 |
| | | | 345/473 |
| 9,513,792 B2 * | 12/2016 | Koshi | G06F 3/0488 |
| 2004/0002983 A1 * | 1/2004 | Ashida | G06F 17/30592 |
| 2006/0031187 A1 * | 2/2006 | Pyrce | G06F 3/04815 |

(Continued)

OTHER PUBLICATIONS

"European Application Serial No. 1400434.6, Office Action dated Feb. 2, 2016", 7 pgs.

*Primary Examiner* — Monica Pyo
(74) *Attorney, Agent, or Firm* — Schwegman Lundberg & Woessner, P.A.

(57) ABSTRACT

On-chart data filtering on computing devices such as, e.g., touch-enabled mobile devices can be enabled by methods, systems, and computer programs that facilitate detecting a filtering gesture performed on an axis element (such as a value range, category label, or category-label row) of a data chart displayed on-screen and, in response to the filtering gesture, filtering data associated with the axis element and updating the displayed data chart based on the filtering.

14 Claims, 20 Drawing Sheets

(56) References Cited

U.S. PATENT DOCUMENTS

| | | |
|---|---|---|
| 2007/0136406 A1* | 6/2007 | Softky .................. G06F 17/246 |
| | | 708/200 |
| 2008/0071748 A1* | 3/2008 | Wroblewski ...... G06F 17/30448 |
| 2011/0115814 A1* | 5/2011 | Heimendinger .... G06F 3/04883 |
| | | 345/619 |
| 2011/0283188 A1 | 11/2011 | Farrenkopf |
| 2011/0283231 A1 | 11/2011 | Richstein et al. |
| 2011/0283242 A1 | 11/2011 | Chew et al. |
| 2012/0072840 A1 | 3/2012 | Koshi et al. |
| 2012/0173963 A1 | 7/2012 | Hoke et al. |
| 2012/0180002 A1 | 7/2012 | Campbell et al. |
| 2012/0210243 A1* | 8/2012 | Uhma ............... G06F 17/30893 |
| | | 715/744 |
| 2013/0097544 A1 | 4/2013 | Parker et al. |
| 2013/0239012 A1 | 9/2013 | Barak |
| 2013/0332810 A1 | 12/2013 | Lin et al. |
| 2014/0078134 A1 | 3/2014 | Kainiemi et al. |
| 2014/0089860 A1 | 3/2014 | Hoyer et al. |

* cited by examiner

| column_1 | column_2 | column_3 | column_4 |
|---|---|---|---|
| c1_value_1 | c2_value_1 | c3_value_1 | c4_value_1 |
| c1_value_2 | c2_value_2 | c3_value_2 | c4_value_2 |
| c1_value_3 | c2_value_3 | c3_value_3 | c4_value_3 |
| c1_value_4 | c2_value_4 | c3_value_4 | c4_value_4 |

FIG. 9A

| Country | Year | Product | Revenue |
|---|---|---|---|
| China | 2012 | Trousers | 371,875.40 |
| China | 2012 | Dresses | 397,452.40 |
| China | 2012 | Sweaters | 418,754.20 |
| China | 2013 | Trousers | 418,890.60 |
| China | 2013 | Dresses | 433,000.50 |
| China | 2013 | Sweaters | 453,741.10 |
| Japan | 2012 | Trousers | 390,456.50 |
| Japan | 2012 | Dresses | 344,561.54 |
| Japan | 2012 | Sweaters | 244,852.01 |
| Japan | 2013 | Trousers | 427,246.54 |
| Japan | 2013 | Dresses | 320,457.47 |
| Japan | 2013 | Sweaters | 228,654.21 |
| Korea | 2012 | Trousers | 318,794.64 |
| Korea | 2012 | Dresses | 237,354.25 |
| Korea | 2012 | Sweaters | 327,854.12 |
| Korea | 2013 | Trousers | 260,546.20 |
| Korea | 2013 | Dresses | 287,457.29 |
| Korea | 2013 | Sweaters | 300,000.00 |

FIG. 9B

| Country | Year | Product | Revenue | Data Context |
|---|---|---|---|---|
| China | 2012 | Trousers | 371,875.40 | 0 |
| China | 2012 | Dresses | 397,452.40 | 1 |
| China | 2012 | Sweaters | 418,754.20 | 2 |
| China | 2013 | Trousers | 418,890.60 | 3 |
| China | 2013 | Dresses | 433,000.50 | 4 |
| China | 2013 | Sweaters | 453,741.10 | 5 |
| Japan | 2012 | Trousers | 390,456.50 | 6 |
| Japan | 2012 | Dresses | 344,561.54 | 7 |
| Japan | 2012 | Sweaters | 244,852.01 | 8 |
| Japan | 2013 | Trousers | 427,246.54 | 9 |
| Japan | 2013 | Dresses | 320,457.47 | 10 |
| Japan | 2013 | Sweaters | 228,654.21 | 11 |
| Korea | 2012 | Trousers | 318,794.64 | 12 |
| Korea | 2012 | Dresses | 237,354.25 | 13 |
| Korea | 2012 | Sweaters | 327,854.12 | 14 |
| Korea | 2013 | Trousers | 260,546.20 | 15 |
| Korea | 2013 | Dresses | 287,457.29 | 16 |
| Korea | 2013 | Sweaters | 300,000.00 | 17 |

FIG. 9C

| Category |
|---|
| Country |
| Year |
| Product |
| Revenue |

FIG. 9D

| Country | Year | Product | Revenue | Data Context |
|---|---|---|---|---|
| China | 2012 | Trousers | 371,875.40 | 0 |
| China | 2012 | Dresses | 397,452.40 | 1 |
| China | 2012 | Sweaters | 418,754.20 | 2 |
| China | 2013 | Trousers | 418,890.60 | 3 |
| China | 2013 | Dresses | 433,000.50 | 4 |
| China | 2013 | Sweaters | 453,741.10 | 5 |
| Japan | 2012 | Trousers | 390,456.50 | 6 |
| Japan | 2012 | Dresses | 344,561.54 | 7 |
| Japan | 2012 | Sweaters | 244,852.01 | 8 |
| Japan | 2013 | Dresses | 320,457.47 | 10 |
| Japan | 2013 | Sweaters | 228,654.21 | 11 |
| Korea | 2012 | Trousers | 318,794.64 | 12 |
| Korea | 2012 | Dresses | 237,354.25 | 13 |
| Korea | 2012 | Sweaters | 327,854.12 | 14 |
| Korea | 2013 | Trousers | 260,546.20 | 15 |
| Korea | 2013 | Dresses | 287,457.29 | 16 |
| Korea | 2013 | Sweaters | 300,000.00 | 17 |

FIG. 11

| Country | Product | Revenue |
|---|---|---|
| China | Trousers | 790,766.00 |
| China | Dresses | 830,452.90 |
| China | Sweaters | 872,495.30 |
| Japan | Trousers | 635,308.51 |
| Japan | Dresses | 665,019.01 |
| Japan | Sweaters | 473,506.22 |
| Korea | Trousers | 579,340.84 |
| Korea | Dresses | 524,811.54 |
| Korea | Sweaters | 627,854.12 |

FIG. 12A

| DRESSES | SWEATERS | TROUSERS | DRESSES | SWEATERS | TROUSERS | DRESSES | SWEATERS | TROUSERS |
|---|---|---|---|---|---|---|---|---|
| CHINA ||| JAPAN ||| KOREA |||

FIG. 12B

| Country | Year | Product | Revenue | Data Context |
|---|---|---|---|---|
| Japan | 2012 | Sweaters | 244,852.01 | 8 |
| Japan | 2013 | Sweaters | 228,654.21 | 11 |
| Korea | 2012 | Dresses | 237,354.25 | 13 |
| Korea | 2013 | Trousers | 260,546.20 | 15 |
| Korea | 2013 | Dresses | 287,457.29 | 16 |

GESTURE-BASED ON-CHART DATA FILTERING

TECHNICAL FIELD

This document generally relates to methods and systems for data filtering and display. More particularly, various embodiments described herein relate to gesture-based filtering of data displayed on a mobile device.

BACKGROUND

In today's data-driven world, business or other data is often accessed on mobile devices. With available mobile-device data-graphing applications, users can conveniently visualize the data, e.g., with two-dimensional (2D) axes charts that present quantitative data in the form of bars for various qualitative categories. Often, a user is interested in a particular data segment and would therefore like to filter out a portion of the data. In existing mobile-device solutions, however, data-filtering functionality is typically limited to individual data points and requires a series of steps. For example, to eliminate a particular data point from view, the user may need to first select the point and then, following the display of a pop-up tool box with "keep" and "exclude" options, choose "exclude" to delete the point. Filtering large amounts of data in this manner is a protracted and cumbersome process. Accordingly, more convenient means for data filtering on mobile devices are needed.

BRIEF DESCRIPTION OF DRAWINGS

The present disclosure illustrates embodiments by way of example and not limitation, and with reference to the following drawings:

FIGS. 9A and 9B illustrate the format in which data may be provided in a generic manner and for an example data set, respectively, in accordance with some embodiments.

FIGS. 9C and 9D illustrate the data of FIG. 9B following pre-processing in accordance with some embodiments.

FIG. 11 illustrates the data set of FIG. 9C following filtering of an individual data point in accordance with some embodiments.

FIGS. 12A and 12B illustrate the data set of FIG. 9B and the associated category axis, respectively, following category-based filtering in accordance with some embodiments.

DESCRIPTION

Disclosed herein are mobile-device solutions for the gesture-based filtering of data categories and value ranges, in addition to individual data points. Gestures, as referred to herein, include, and in many embodiments mean, touch-based gestures as are nowadays commonly used in operating mobile devices with touch screens, such as smart phones or tablets (e.g., Apple's iPhone™ or iPad™, Samsung's Galaxy™, or Google's Nexus™). In some embodiments, "hold-and-swipe" gestures provide a user-friendly, intuitive means for selecting and eliminating data with a smooth continuous gesture. The term "hold," as used in this context, generally refers to the continued touching of an on-screen object for a certain period of time (e.g., one second or more), and the term "swipe" refers to a motion of the user's finger (or a stylus or other touching object) across the screen in generally one direction (e.g., to the right or upwards). A "hold-and-swipe" gesture is a composite of a "hold" followed immediately (i.e., without disengagement of the finger or other touching object from the screen) by a "swipe," which is typically perceived by the user as a single gestures (as distinguished from a two-part gesture involving two discrete touches). Of course, other touch-based gestures may also be used to filter data in accordance herewith, as described below. Further, although the solutions provided herein are primarily intended for use with mobile devices and touch-based gestures, various embodiments may also be applicable to desktop computers and other stationary systems, as well as to user-input modalities that do not involve touching a screen. For example, a hold-and-swipe gesture may be accomplished with a traditional computer mouse by clicking on a screen object and, while holding the left mouse button down, moving the mouse, thereby, e.g., "swiping" a cursor symbol across the screen.

Figure 1:
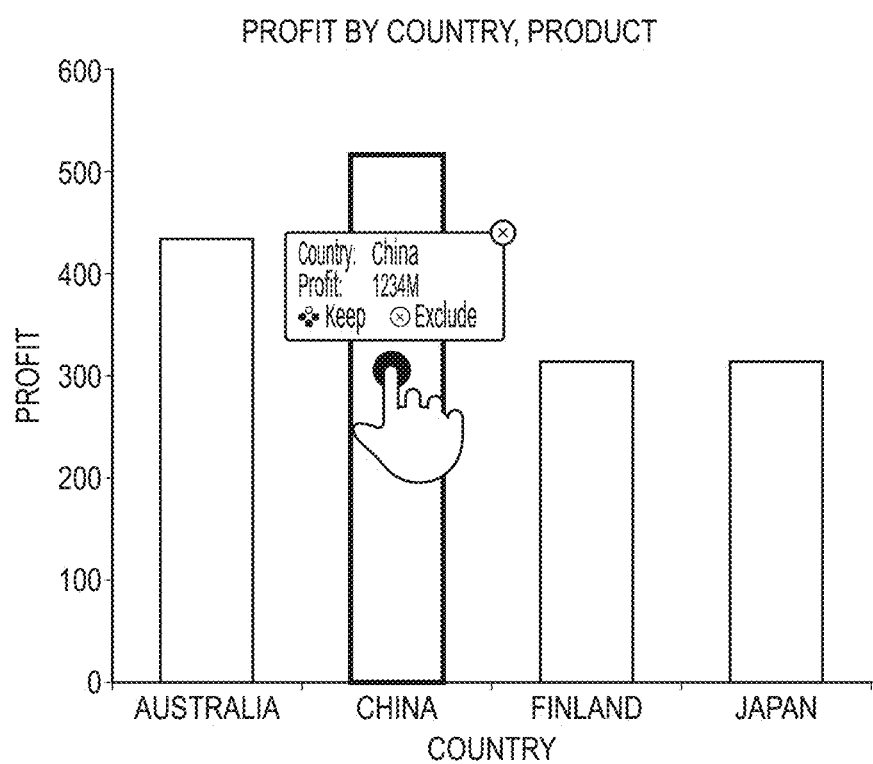
FIG. 1 illustrates a method for two-step data-point filtering.

In various embodiments, data filtering is performed on a 2D-axes chart that includes a value axis and a category axis. A simple example is shown in FIG. 1. Herein, the profit made by a company in four different countries is depicted in the form of a bar diagram. The four countries, which correspond to four qualitative categories, are distributed along the horizontal axis (x-axis), and the profit values, in thousands of dollars, are specified along the vertical axis (y-axis). The data for each country is depicted as a bar whose length (or upper end) indicates the profit attributable to that country. As will be readily apparent to one of skill in the art, the same data may, alternatively, be displayed with a horizontal value axis and a vertical category axis. To avoid confusion, however, the examples used throughout this disclosure consistently display categories along the horizontal axis.

As will be apparent from various of the following figures (e.g., FIG. 2A), data may be categorized in more than one dimensions. For example, sales and profit data may be provided by country (as in FIG. 1), year, and type of product; annual financial-performance data for a company may be provided by quarter and division; weather statistics may be provided by geographic region, time of day, and time of year; and energy-usage data may be provided by country and source of energy, to name just a few. For such multi-dimensionally categorized data, the different category dimensions may be reflected by multiple rows of category labels along the category axis. Each position along the category axis then corresponds to one combination of categories, e.g., the profits from the sale of trousers in China in 2013. As explained in detail below, data filtering in accordance with embodiments can be performed on each of the category dimensions, or on combinations thereof. For example, if data for only one of two years is of interest, the data for the other year may be deleted from the chart. Alternatively, data may be aggregated across multiple categories.

In embodiments, data may also be filtered based on value ranges. A user reviewing sales data, for instance, may be interested in only the lowest and the highest performers, and may therefore want to hide a large middle range of values from view. Conversely, a user may not be interested in extreme outliers, and delete them from the graph while retaining data falling between specified minimum and maximum values. As will be readily apparent to those of skill in the art, value-based filtering is also applicable to charts with two value axes. Two-value-axes charts may be used, for example, to depict one quantitative parameter as a function of another quantitative parameter (as opposed to a qualitative category); an example is the average weight of children as a function of their age. In addition, two-value-axes charts may be used to visualize three-dimensional (3D) (or higher-dimensional) data sets, using the two value axes for two of the dimensions and a suitable symbol for the third dimensions. In a bubble chart, for example, data may be depicted with circles whose location along the horizontal and vertical value axes specifies two values and whose diameter reflects the third value. In addition, the color of the circle may be used to indicate a certain category. To provide a concrete example, a bubble chart may depict the gross domestic product (GDP) and life expectancy for several countries, with bubble diameters proportional to the countries' respective population sizes.

Note that, where the present disclosure speaks of "filtering out" (or "deleting," "eliminating," etc.) data points or ranges, this need not necessarily, and typically does not, imply that the underlying data itself is deleted from memory. Rather, the data that is not of interest to the user is simply removed from the displayed chart. In some embodiments, data that has been filtered out of a chart is tracked in a manner that allows the user to easily retrieve the data. For example, the deleted data sets may be retained in a "trash bin," and may be restored to the chart with a special "recovery" gesture, such as a hold-and-swipe in the opposite direction as was used to delete the data.

FIGS. 1 through 5E illustrate various methods of data filtering, showing both the contents displayed on the mobile device screen (or a relevant portion thereof) and, overlaid thereon, a schematic representation of the user's hand and its motions. With renewed reference to FIG. 1, a conventional method for filtering a data point with a two-part gesture is depicted. In the example shown, the user has selected profit data for China for elimination from the chart, e.g., by briefly touching (or "tapping") the respective data column on the touch display of her mobile device. In response to the touch, a pop-up "tool-tip," i.e., a small window identifying the category and value of the selected data point and providing "keep" and "exclude" options," appears. By tapping the "exclude" symbol, the data point is removed from the displayed chart.

Figure 2A:
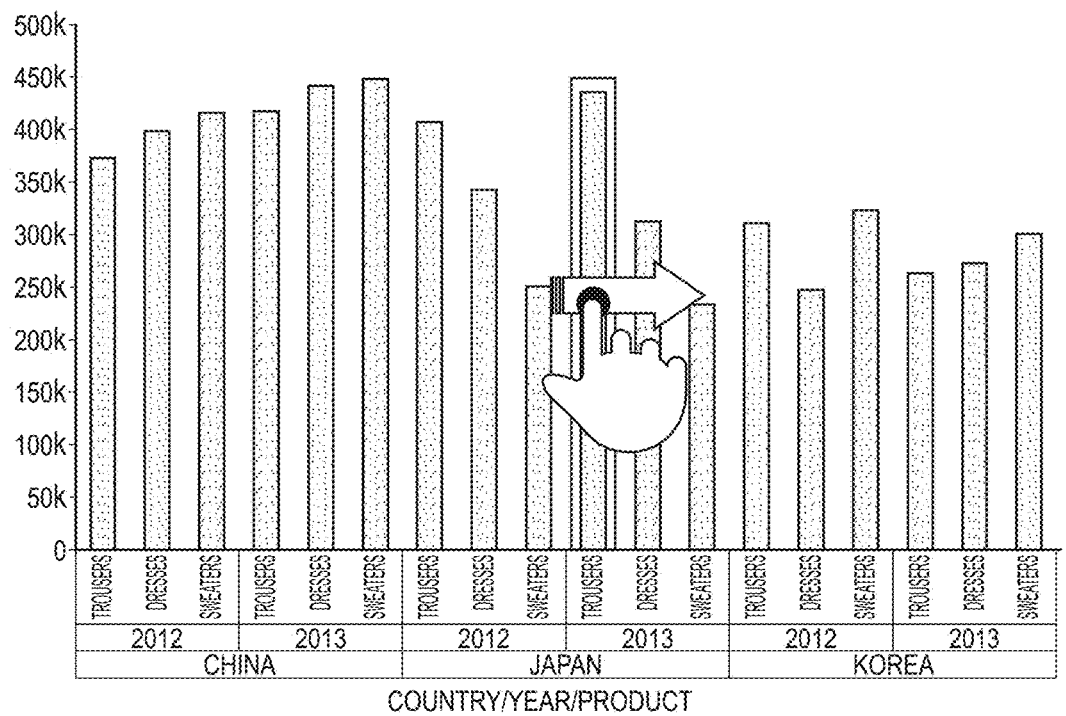
FIGS. 2A and 2B illustrate the filtering of an individual data point according to some embodiments.
Figure 2B:
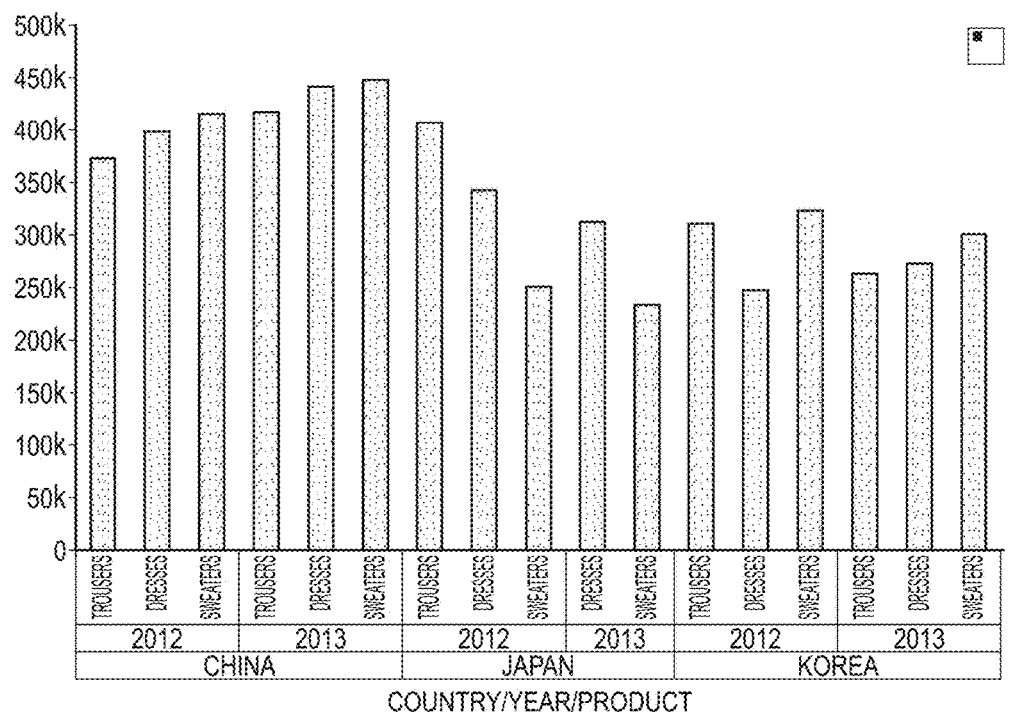

By contrast, FIGS. 2A and 2B illustrate data-point filtering in accordance with various embodiments. In the depicted example, profit data is shown for three category dimensions: country, year, and type of product. As shown in FIG. 2A, the user has selected the data for trousers sold in Japan in 2013 for deletion by touching the corresponding data bar; the data bar may be highlighted to visualize the selection. By swiping her finger to the right, the user may signal that the selected bar is to be deleted. As a result of this deletion gesture, the screen is refreshed with an updated chart, shown in FIG. 2B. The deleted data point is missing from the updated chart, whereas all other data points are unaffected. Thus, the profit data for Japan in 2012 includes data for trousers, as does the data for both 2012 and 2013 for countries other than Japan.

Figure 3A:
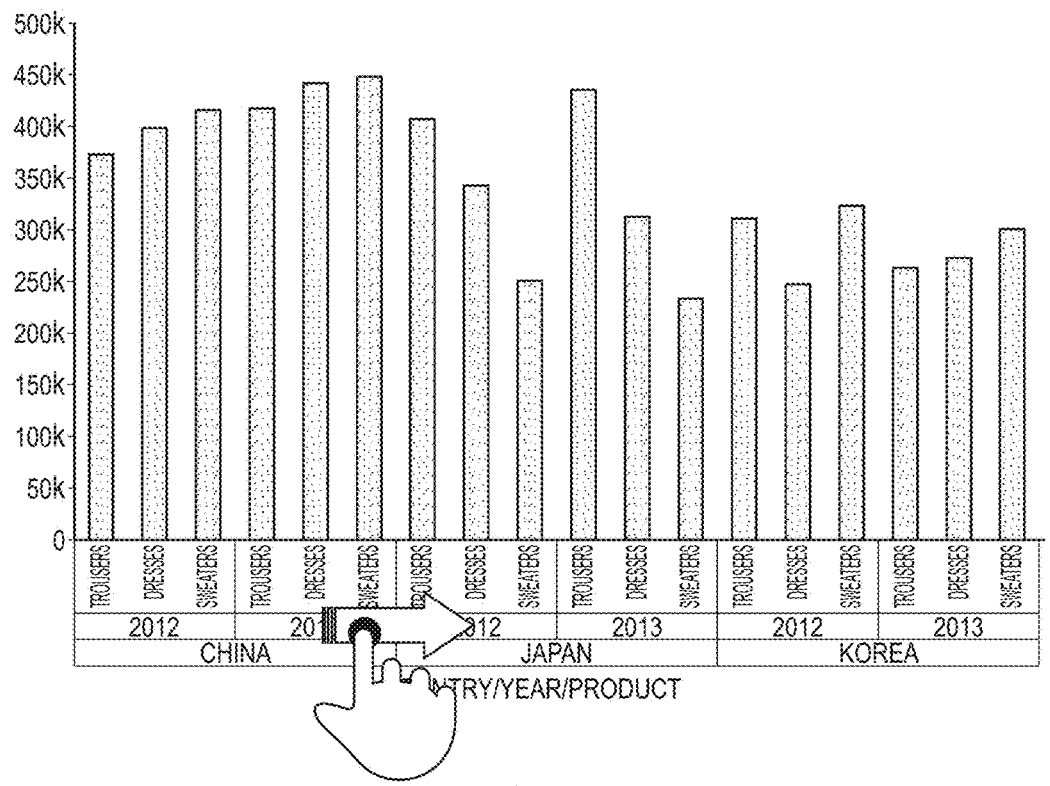
FIGS. 3A and 3B illustrate category-based filtering in aggregation mode according to some embodiments.
Figure 3B:
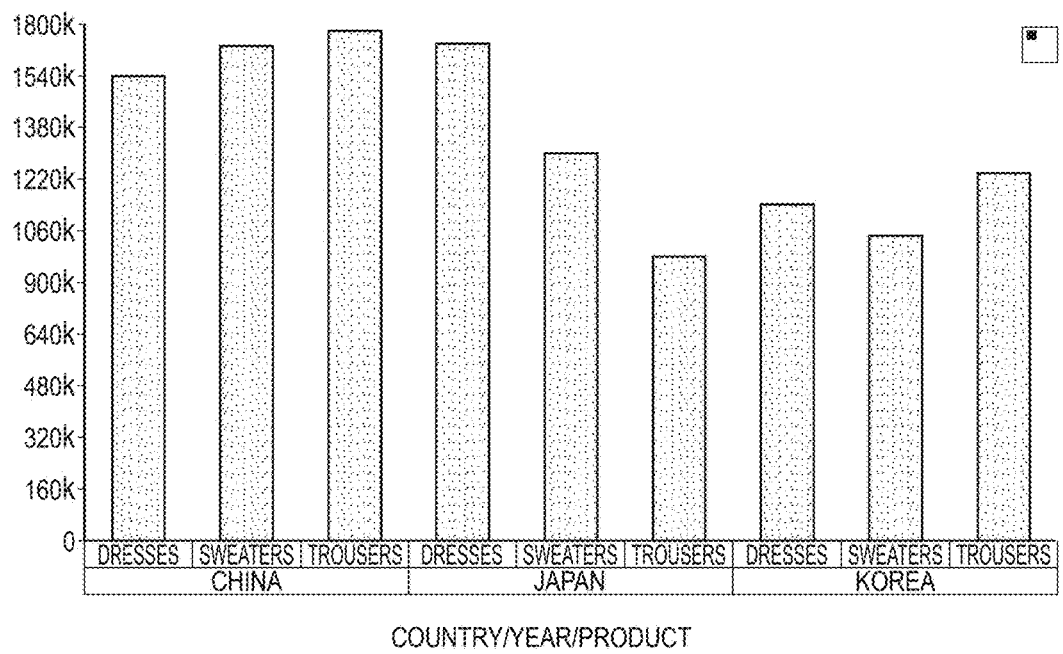

In many usage scenarios, a user is not interested in filtering out a single, or a few individual points, but an entire category. When a category is filtered, the data may be averaged or aggregated across the selected category dimension. For example, the user may not care about year-to-year fluctuations, and be interested in average yearly profits, or profits aggregated over multiple years. FIGS. 3A and 3B illustrate an example of such category-based filtering. Here, the user has selected, among three category dimensions, the "year" dimension to be filtered out. By performing a touch-and-slide gesture on the row of category labels that contains the year labels, categorization of the data by year can be removed. The result, shown in FIG. 3B is a chart in which data is aggregated across the years (i.e., in the specific depicted example, the profit values for 2012 and 2013 are added for each combination of country and product type).

Figure 4A:
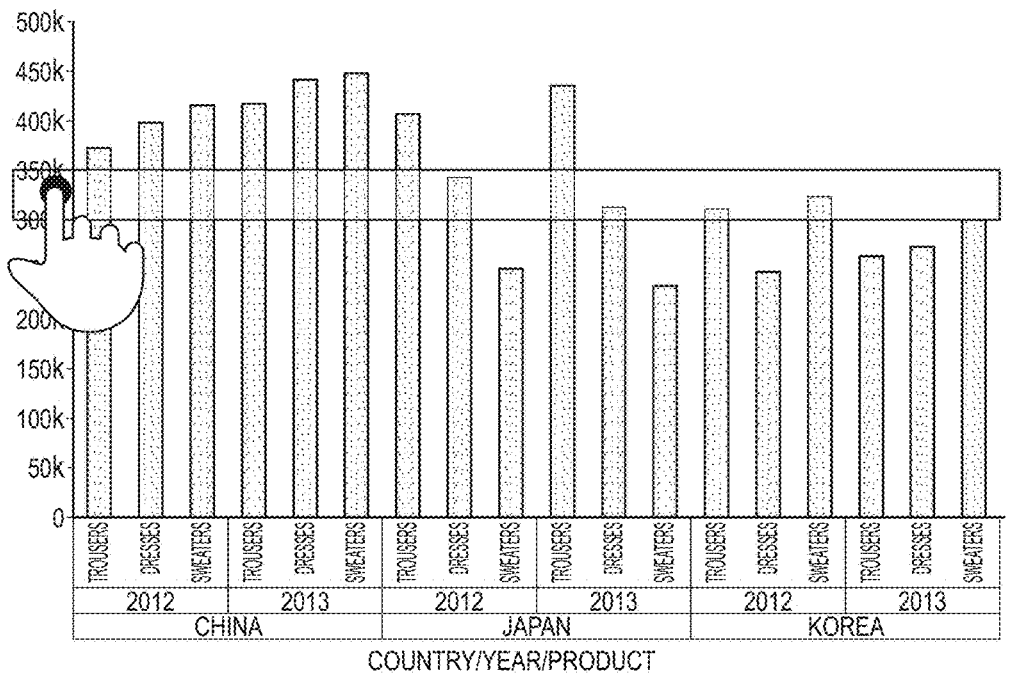
FIGS. 4A-4D illustrate value-range-based filtering according to some embodiments.
Figure 4B:
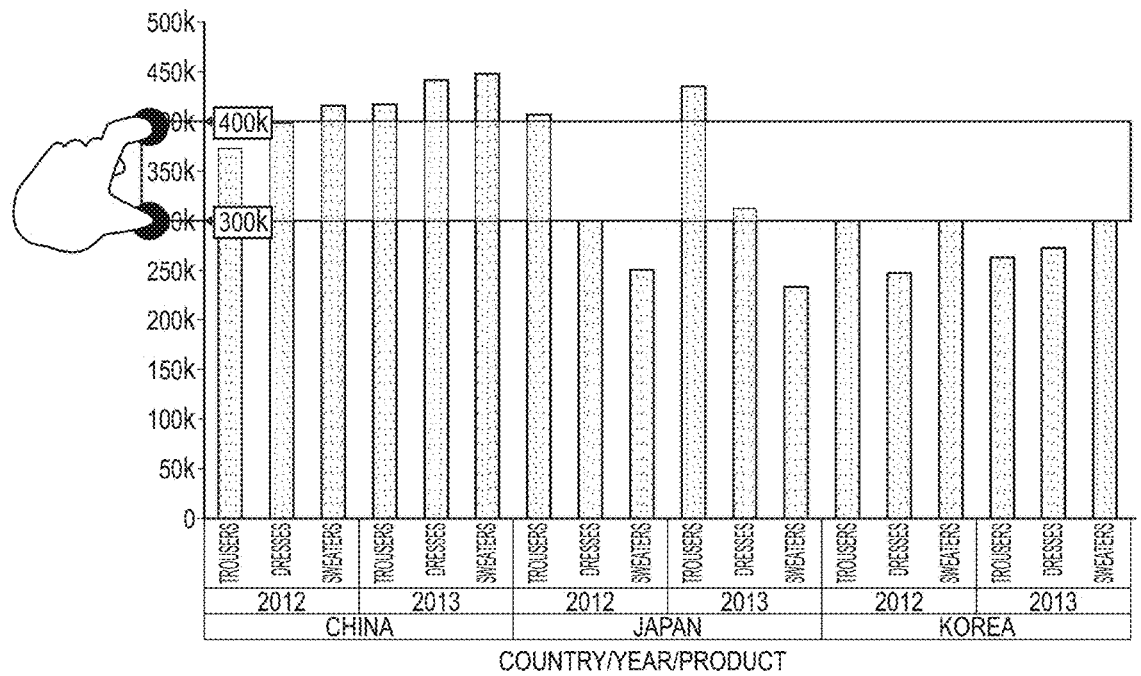
Figure 4C:
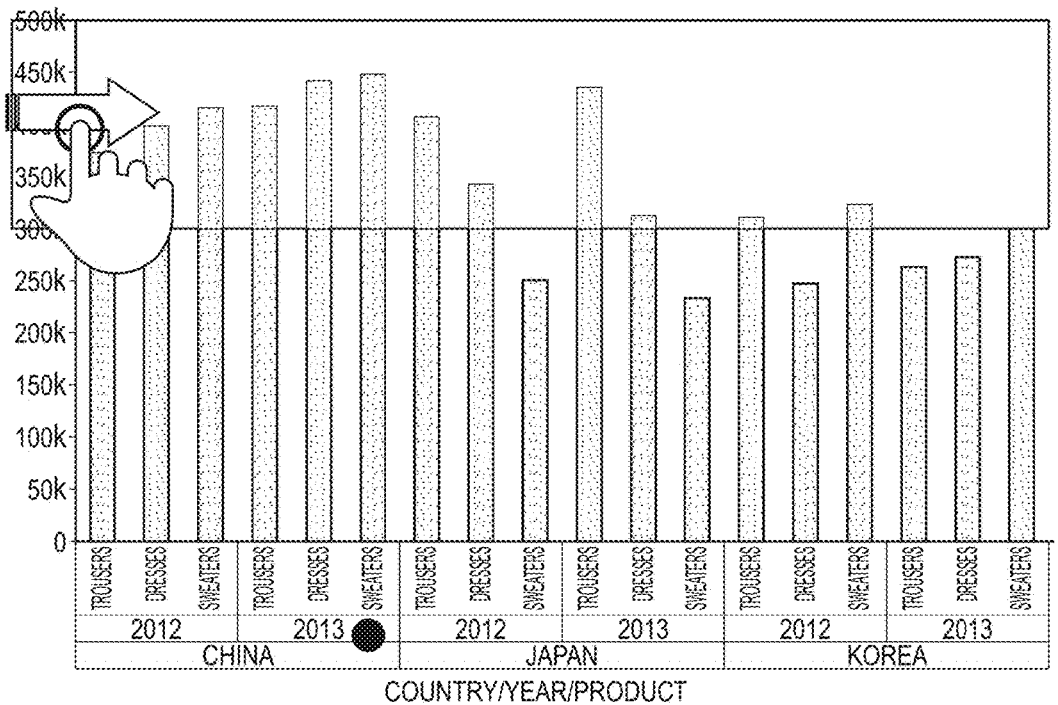
Figure 4D:
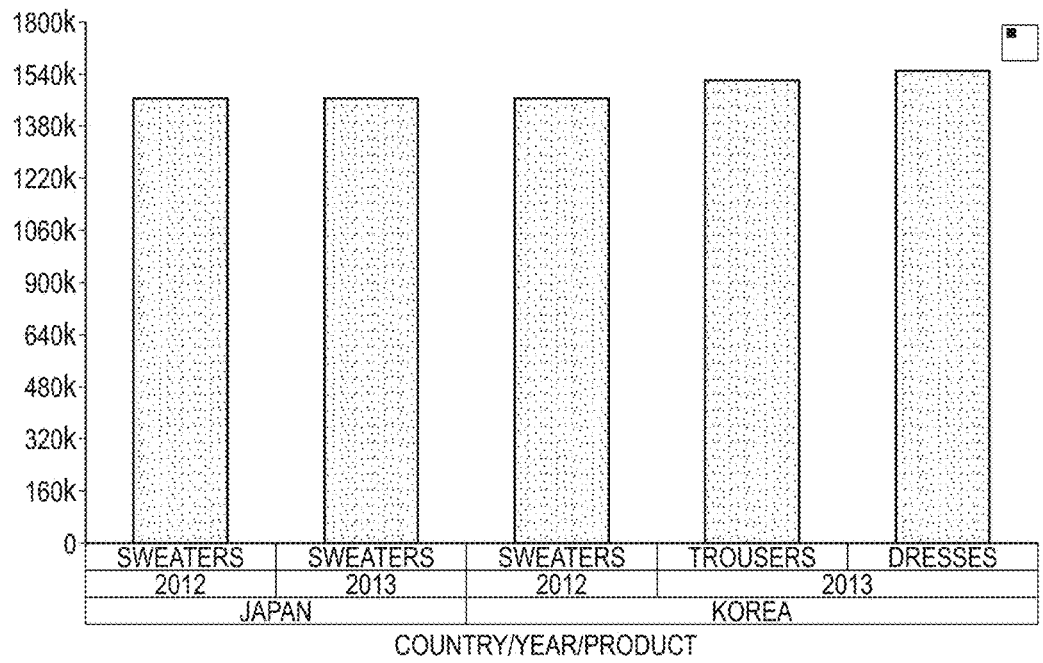

Another usage scenario is data filtering based on values or value ranges; an example is illustrated in FIGS. 4A-4D. By touching the value axis, an editing mode may be triggered. In this mode, the user may define a data range to be deleted by moving two fingers that touch the value axis at different points relative to each other along the axis to adjust the range; for example, as schematically depicted in FIG. 4B, the user may use his thumb and index finger to select the lower and upper boundaries, respectively, of the range. The selected range may be visualized on-screen, e.g., by depicting the boundary lines of the range and/or a semi-transparent band thereacross. To provide precise feedback about the selected range to the user, the boundary values of the selected range may also be textually displayed. If the user does not adjust the range manually (e.g., with a two-finger gesture as described), a default value range, e.g., having a width of one unit, may be selected based on the location where the axis was touched. Once the value range has been selected, the user may swipe one or both fingers to the right, as shown in FIG. 4C, to complete the filtering. The result is an updated chart, illustrated in FIG. 4D, from which any data points whose values fall in the selected range are missing.

Figure 5A:
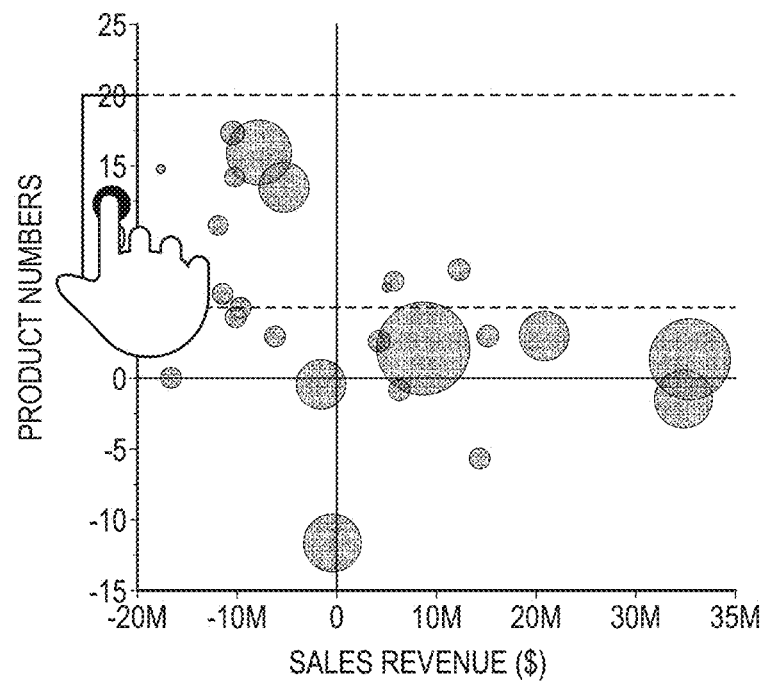
FIGS. 5A-5F illustrate value-range-based filtering on a two-value-axes chart according to some embodiments.
Figure 5B:
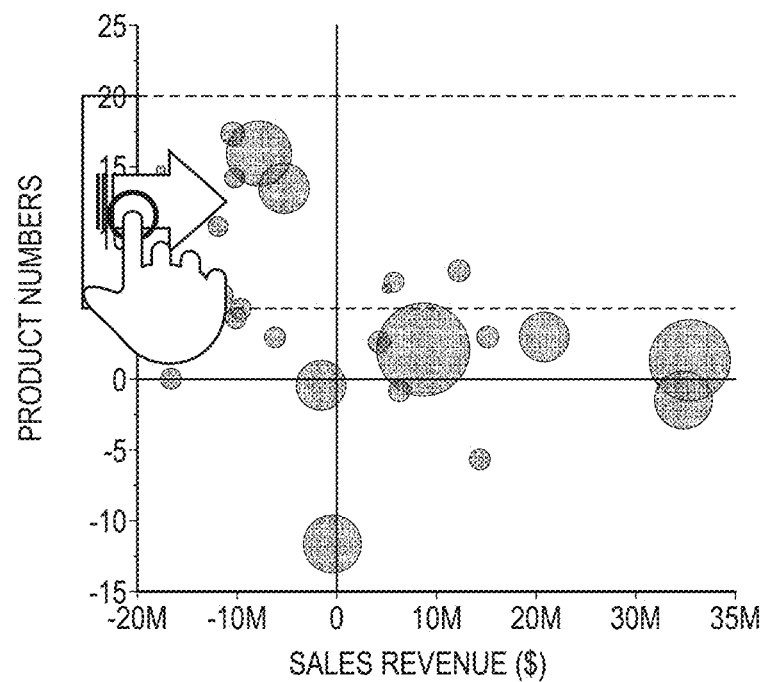
Figure 5C:
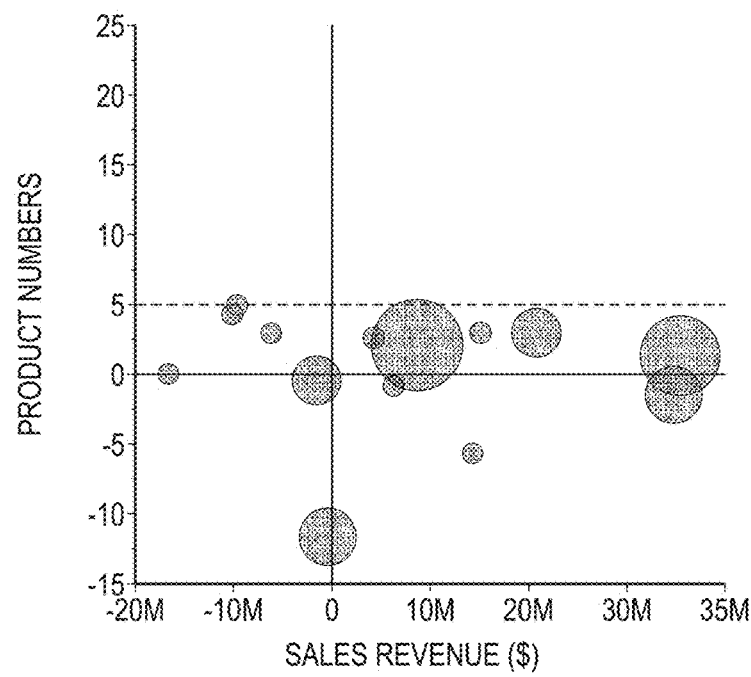
Figure 5D:
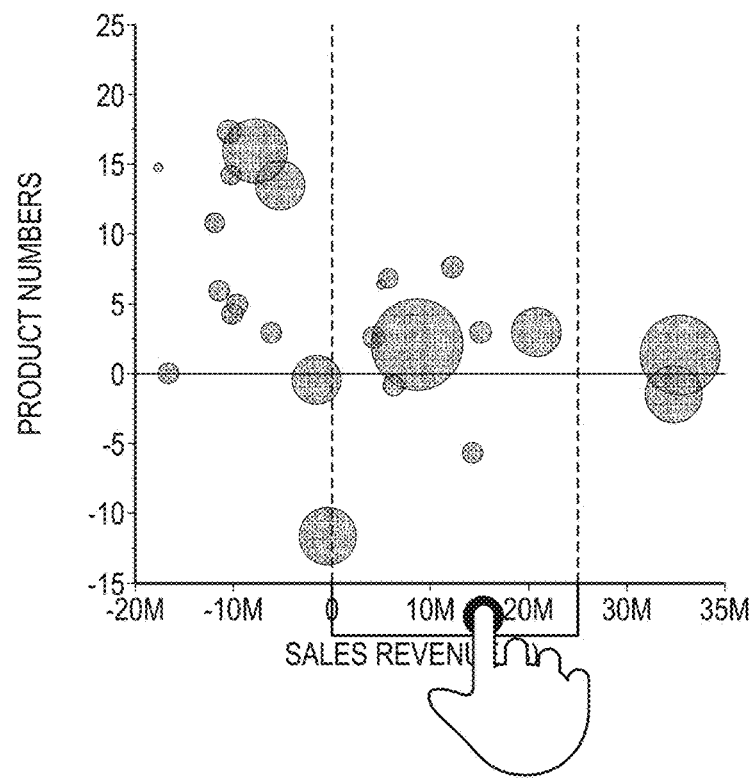
Figure 5E:
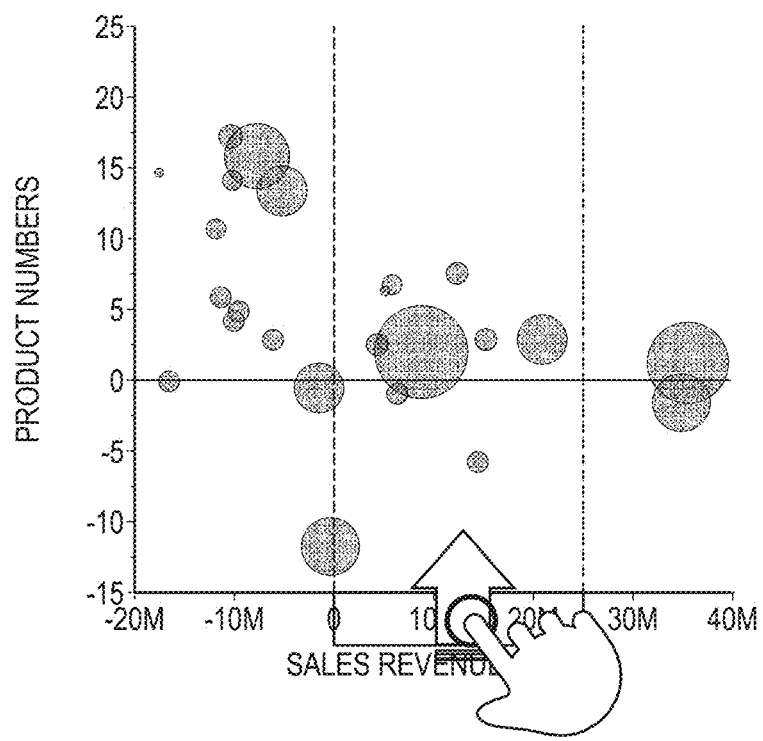
Figure 5F:
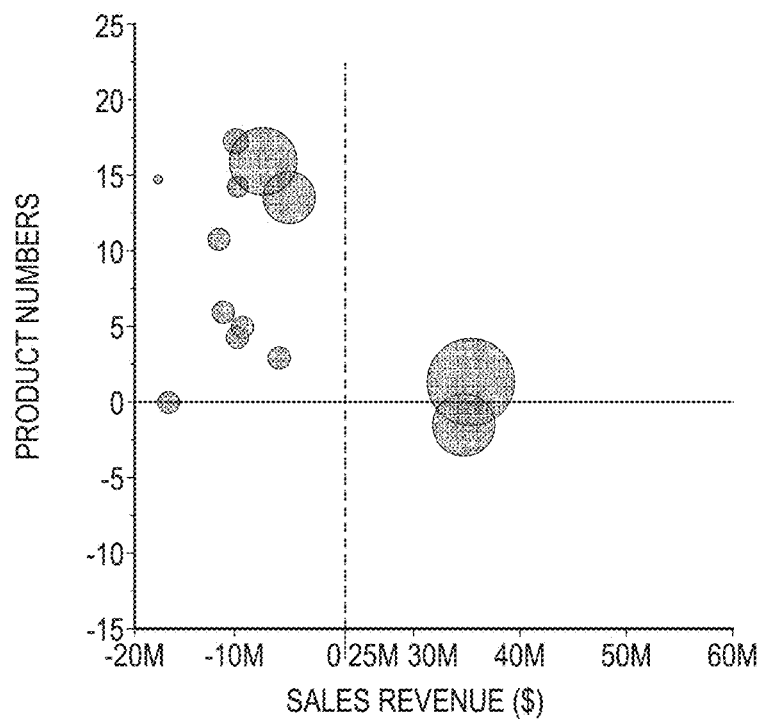

As will be readily appreciated by one of skill in the art, value-based filtering is also applicable to charts with two value axes. FIGS. 5A-5F, for example, illustrate value filtering on the two axes of a bubble chart. A value range on the vertical axis may be selected and deleted in the same manner as described above with respect to FIGS. 4A-4C; this is shown in FIGS. 5A and 5B, and the result of the filtering is shown in FIG. 5C. Similarly, a value range on the horizontal axis may be filtered out by touching the horizontal axis, adjusting the range with two fingers (or using a default range), and then swiping the finger(s) upward to effect the deletion, as shown in FIGS. 5D and 5E. The result of value filtering along the horizontal value axis is provided in FIG. 5F.

Regardless of whether the depicted data is filtered point by point, by category, or by value range, the filtered-out data (or entire data sets prior to the filtering) may be retained in a virtual "trash bin," from which it may be restored by the user. Each data set in the trash bin is associated with a particular filtering action. In some embodiments, to limit memory requirements, data is retained for only a limited number of filtering actions, e.g., the last three actions, the last nine actions, or the last twenty actions. If the total number of filtering actions performed by the user on a particular data set exceeds the specified maximum number, the oldest action is typically deleted to allow data for the most recent action to be saved without exceeding the maximum. In other embodiments, the trash bin may store data for an unlimited number of filtering actions, subject only to the availability of sufficient memory on the mobile device (or other computing device).

Figure 6A:
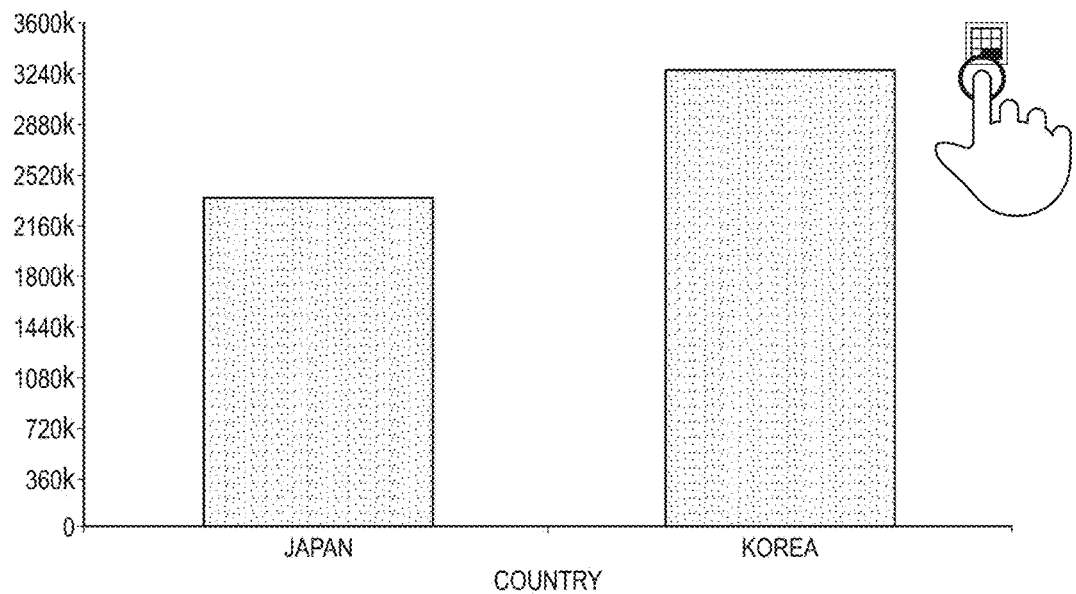
FIGS. 6A and 6B illustrate the retention of filtered-out data in, and recovery thereof from, a trash bin according to some embodiments.
Figure 6B:
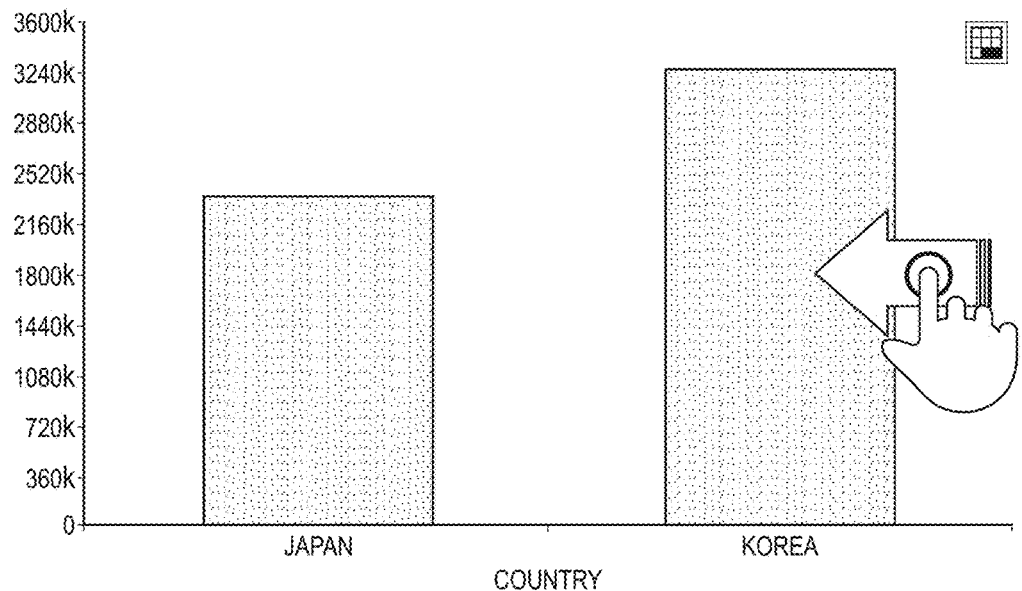

In some embodiments, data can be recovered from the trash bin after the user has activated a recovery mode, e.g., by tapping a suitable symbol on the data chart, as shown in FIG. 6A. Once the recovery mode has been activated, the user may restore data from the trash bin, e.g., with a gesture mirroring that which was employed to move the data to the trash bin in the first place. For instance, if data was deleted using a hold-and-swipe gesture to the right, this filtering action may be reversed with a hold-and-swipe gesture to the left, as shown in FIG. 6B. In some embodiments, filtering actions can be reversed only in an order reverse to the order in which they were performed on the original set, such that, e.g., the most recently deleted data needs to be restored before the data in the second-to-last filtering action can be recovered. In other embodiments, any filtered-out data can be restored at any time (as long as it is still in the trash bin), and an updated active data set is reconstructed from the present active data set and the recovered data; in other words, the recovered data is added back into the chart. In yet other embodiments, each of the different inactive data sets captures the complete state of the chart prior to a particular filtering action and can be restored at any time, which reverses all filtering actions from the most recent on up to and including that particular filtering action.

The data-filtering and -recovery methods described above can be modified and extended in various ways, as a person of skill in the art will readily appreciate. For example, different types of gestures may be used. In some embodiments, instead of relying on a hold-period of a certain length (e.g., half a second, one second, or two seconds) to select an object, as is done with a hold-and-swipe gesture as described above, selection of data for deletion may be based on touching the relevant screen portion (e.g., a data point, category label, or value range) simultaneously with two fingers and then swiping both fingers. Thus, a two-finger touch-and swipe may be used in place of a hold-and-swipe gesture. In other embodiments, individual data points may be filtered with a double-tap on the data point, whereas data collections including, e.g., all data points within a certain category or value range may be filtered with a hold-and-swipe gesture. For more complex actions, such as, e.g., value-based filtering, the gesture may be composed of multiple sequentially performed gestures or gesture parts; thus, a first gesture part (e.g., a tap on the value axis) may be used to initially activate value-range filtering mode, a second gesture part (e.g., a two-finger gesture) may be used to adjust the value range, and, finally, a third gesture part (e.g., a hold-and-swipe gesture on the selected value range) may cause the filtering.

In some embodiments, a user may have the option to select gestures from a gesture library, or even define his own gesture(s); the selected gesture(s) may then be bound to certain filtering or recovery functionalities. For example, to accommodate left-handed users, a hold-and-swipe to the left may be selected for data deletion, and a hold-and-swipe to the right in trash-bin view may serve to recover filtered data. Alternatively or additionally to allowing users to select their own gestures, users may have the ability to define certain gesture parameters. For instance, with a hold-and-swipe gesture, the user may be allowed to set the requisite hold time to his comfort level.

Gesture-based filtering may be enhanced by various visual (or audio) cues that provide feedback to the user and/or guide her gestures. For example and without limitation, a user's selection of a data point, category, or range may be visualized by highlighting the selected data, emphasizing it with a bright border, or displaying a cursor symbol (e.g., a symbolic hand) overlaid onto the selected object. Further, to indicate that a swipe action in a certain direction will cause deletion of the data, an arrow pointing in that direction may be displayed. Alternatively, the user may be informed of possible actions and the corresponding gestures (such as "swipe to the right to remove the selected data") with a text message popping up on the screen or an audio output.

Figure 7:
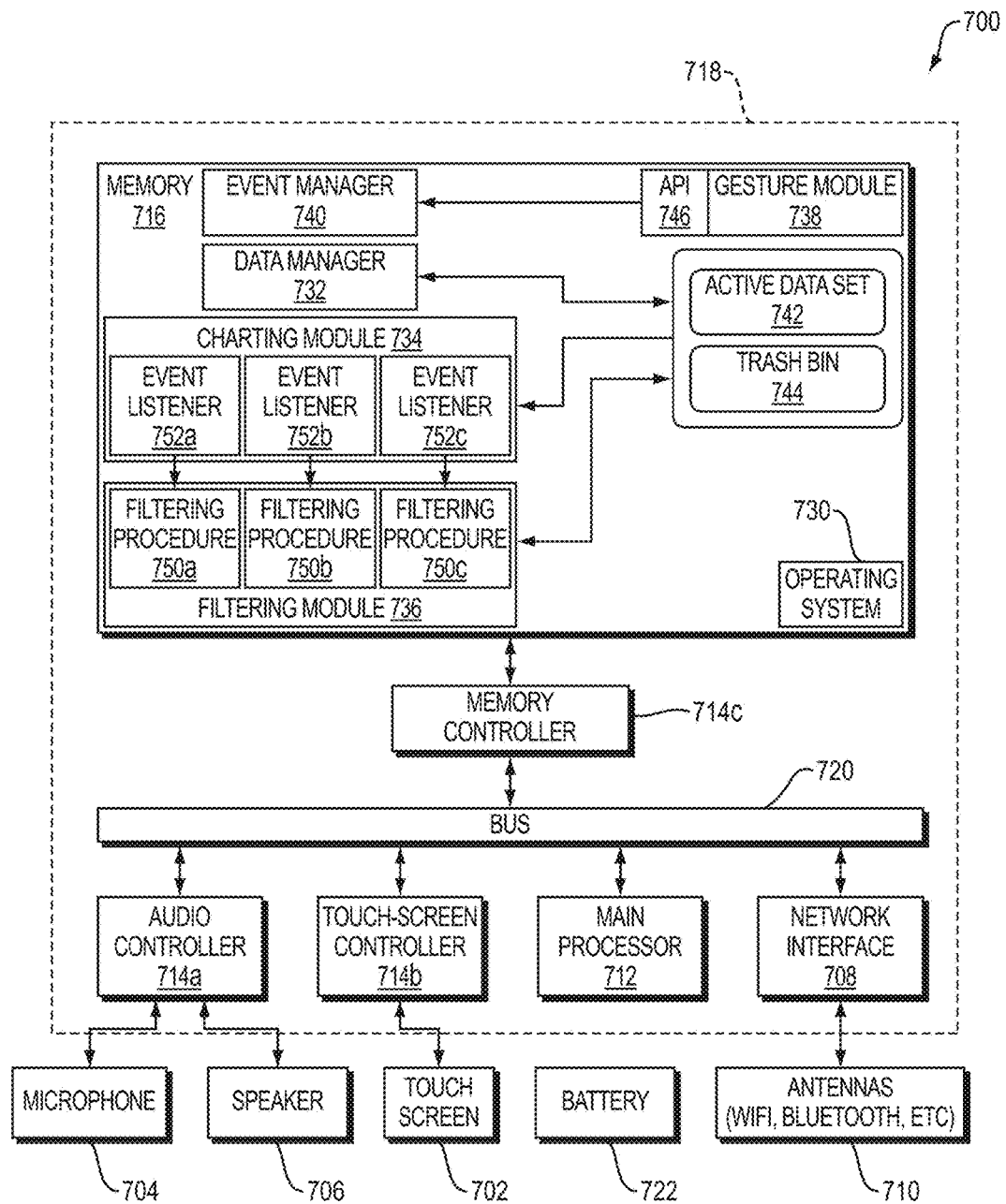
FIG. 7 illustrates an example system providing charting and filtering functionality in accordance with various embodiments.

The above-described functionality can generally be implemented in hardware, firmware, software, or any suitable combination thereof. In some embodiments, data filtering functionality as described herein is provided on a touch-enabled computing device, such as a touch-enabled smartphone. Touch-enabled smartphones are readily commercially available from various vendors, such as Samsung, Apple, Huawei, or Lenovo, among others. FIG. 7 conceptually illustrates, in simplified block-diagram form, an example smartphone architecture. The smartphone 700 includes a touch screen 702 (e.g., a capacitive touch screen), a microphone 704 and speaker 706, one or more network interfaces 708 and associated antennas 710 for establishing wireless connections (e.g., Bluetooth, WiFi, or GPS), one or more processors 712, 714a, 714b, 714c and memory components 716 integrated in a system-on-chip (SoC) 718 and communicating with each other via a bus 720 (e.g., an AMBA AXI Interconnect bus), and a battery 722. To reduce the processor power requirements and thereby extend battery lifetime (i.e., the time the battery 722 lasts until it needs to be recharged), a low-power general-purpose processor 712 (e.g., an ARM processor) is typically used, often in conjunction with dedicated special-purposes processors 714a, 714b, 714c that are optimized for their respective functionalities; such processors may include dedicated controllers 714a, 714b, 714c for various hardware components (e.g., an audio controller 714a, a touch-screen controller 714b, and a memory controller 714c) that implement their functionality directly in hardware (rather than executing software implementing such functionality) as well as video and 3D accelerators (not shown) that perform specialized image-processing functions. The memory components 716 may include volatile memory (e.g., SRAM or DRAM) as well as non-volatile memory (e.g., flash memory, ROM, EPROM, etc.).

The memory typically stores an operating system 730 (e.g., Google's Android™ or Apple's iOS™) and one or more higher-level software applications (conceptually illustrated as various modules), as well as data associated therewith. For instance, in the context of data charting and filtering in accordance herewith, the various software applications may include the following modules: a data manager 732 that controls the retrieving, storing, and optionally pre-processing of data in preparation for display and/or filtering; a charting module 734 that creates screen objects (e.g., axes, labels, and data objects (such as points, bars, bubbles, etc.) from the data and causes their display; a filtering module 736 that implements data filtering and data recovery procedures based on user input; a gesture module 738 in communication with the touch-screen controller 714*b* that detects user input via touch-based gestures; and an event manager 740 that triggers various functions (e.g. of the charting and filtering modules) based on gestures recognized by the gesture module 738. The charting module 734 may have read access, and the data manger 732 and/or filtering module 736 may have read and write access to the data, which may be stored in one or more data sets 742, 744. For example, in some embodiments, an active data set 742 reflects updates based on any filtering actions that have taken place, and a trash bin 744 stores one or more previous (and now inactive) data sets corresponding to the data sets prior to filtering or, alternatively, the portions thereof that have been filtered out.

In various embodiments, the gesture-detection functionality of module 738 is provided natively, i.e., as part of the software originally installed on the smartphone by the smartphone vendor. Web browsers running on touch-enabled Android or iOS phones, for example, typically have built-in functionality to recognize certain touch events, such as "touchstart" (which fires when the user touches the screen), "touchend" (which fires when the finger is removed from the screen), and "touchmove" (which fires when a finger already placed on the screen is moved thereacross). Additional applications may be installed at a later time by the user, e.g., by downloading them from an application server on the Internet (using one of the wireless connections enabled on the smartphone). Thus, the user may, for instance, download a charting application that integrates the functionality of the data manager 732, event manager 740, and charting module 734, allowing the user to download, view, and chart data, and optionally to interact with and navigate the data chart via gestures, e.g., to zoom in and out of portions or scroll through the chart. To facilitate gesture-based user input, the charting application may utilize the native gesture-detection functionality via a gesture API 746.

The filtering module 736 may be provided in the form of a separately downloadable plug-in to the charting application, and may include procedures 750*a*, 750*b*, 750*c* for the various filtering or recovery actions (e.g., data-point filtering, category-based filtering, and value-range-based filtering, as well as data recovery from the trash bin). To tie in with the charting application, the filtering module may define different gesture-based filtering events for the various filtering actions, and bind corresponding event listeners 752*a*, 752*b*, 752*c* to the applicable respective screen objects managed by the charting module 734 (e.g., bind a category-filtering event listener to a category axis). In response to performance of one of the defined filtering gestures on a screen object, the respective event listener 752*a*, 752*b*, 752*c* then dispatches a filtering event to the appropriate filtering procedure 750*a*, 750*b*, 750*c*. (Note that the number of event listeners is not limited to three.) In alternative embodiments, the charting and filtering functionalities (as provided collectively by modules 732, 734, 736, 740) are integrated into a single application. Of course, as will be readily appreciated by one of skill in the art, the functionality described herein can be grouped and organized in many different ways, and need not be implemented with the specific modules depicted in FIG. 7, but can be provided by different, fewer, or more modules (if modularized at all), and can utilize native functionality to a greater or lesser extent. For example, the filtering application may define filtering gestures based on native gestures (e.g., as a composite gesture including a sequence of native primitive gestures within certain parameter ranges) or independently therefrom. In some embodiments, the filtering application includes a customization module that allows the user to specify gesture parameters (e.g., the hold period used to select an object) and/or define her own gestures.

Furthermore, although a specific system for data charting and filtering is described above with respect to FIG. 7, this is but one possible embodiment, and many variations and modifications thereof, as well as very different system embodiments, are contemplated. For example, although mobile devices and mobile applications constitute an important application scenario, the data filtering functionality described herein may also be implemented on a stationary device, such as a desktop personal computer (PC). In general, a computing device in accordance with an embodiment hereof includes one or more processors, memory, and, in communication therewith, a screen and one or more input devices; the type of components used may vary depending on the device. (For instance, a PC may rely more heavily on a general-purpose processor than on special-purpose controllers, and may utilize an x86 processor rather than an ARM processor.) In touch-screen devices, the screen may double as the input device (or one of the input devices). However, in various embodiments, filtering gestures may alternatively be performed with traditional input devices such as a mouse.

Further, the various software components that provide the charting, filtering, and/or data-recovery functionality described herein can generally be provided on any computer-readable (or "machine-readable") medium, or multiple media, whether volatile, non-volatile, removable, or non-removable. Example computer-readable media include, but are not limited to, solid-state memories, optical media, and magnetic media. The machine-executable instructions stored on such media may generally be implemented in any suitable programming language (or multiple languages), for example and without limitation, in Objective-C, C, C++, Java, Python, PHP, Perl, Ruby, and many others known to those of skill in the art.

Figure 8A:
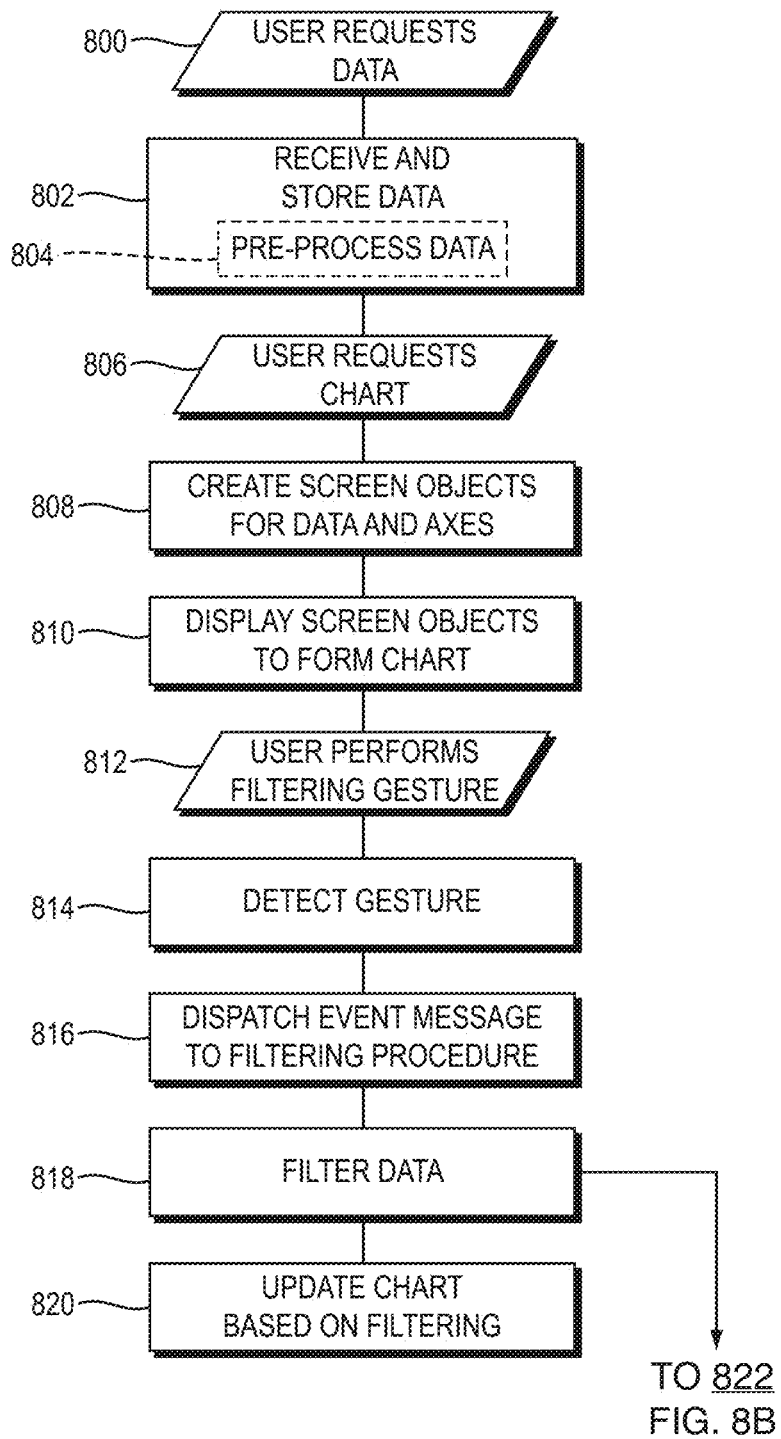
FIGS. 8A and 8B illustrate methods for data charting and filtering in accordance with various embodiments.
Figure 8B:
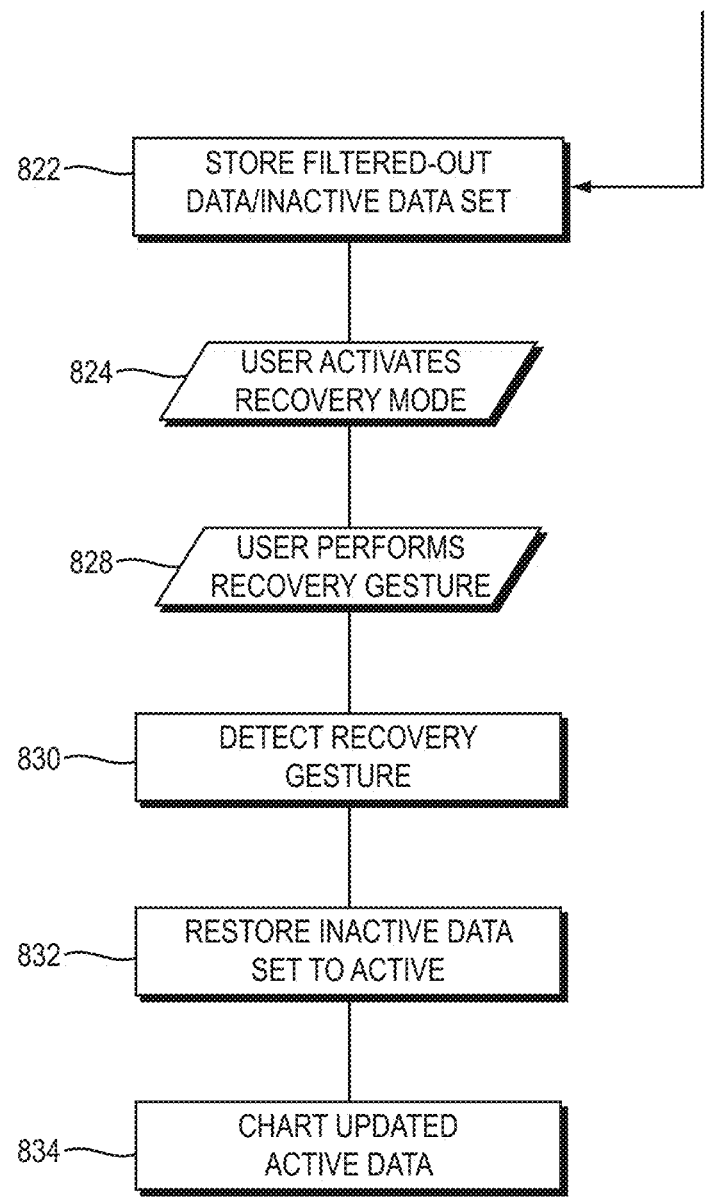

FIGS. 8A and 8B provide an overview of methods for data charting and filtering in accordance with various embodiments; actions executed by the user, which provide input to the system, are illustrated with oblique parallelograms. The process generally begins when the user requests the data subsequently to be charted, e.g., by downloading it from a web site, accessing it from a file, importing it from another application running on the user's mobile (or other) device, or in any other manner (800). Upon receipt, the charting application (e.g., its data manager 732) stores the data in memory (802). In some embodiments, the data is pre-processed to prepare it for charting and/or filtering (804), as explained in more detail for one example implementation below. Once the user requests the data to be charted (e.g., by clicking on a charting icon) (806), screen objects corresponding to each data point and each axis element are created (808) and displayed on the screen to form the data chart (810). As understood herein, an "axis element" is generally any portion of a chart axis and its associated labels that can be selected by a user for filtering actions in accordance herewith. Axis elements include, e.g., a value axis or a value range (corresponding to a portion of the value axis), an individual category label, or a row of labels of one category type. For example, FIG. 3 illustrates three category-label rows corresponding to three types of categories: product type, year, and country; each of these rows may constitute an axis element. Further, within the year-label row, there are two category labels (although each displayed multiple times), one for 2012 and one for 2013, and each of these two labels may constitute a separate axis element.

As mentioned above, event listeners may be bound to each of the screen objects, (i.e., to each data point and each axis element). Then, when a user performs a defined filtering gesture on one of the screen objects (812), the event listener associated with that object detects this gesture (814) and dispatches an event message to the corresponding filtering procedure (which acts as an event handler) (816). The filtering procedure thereafter accomplishes the desired filtering action on the active data set 742, specifically on the portion of the active data that is associated with the selected screen object (which portion usually contains, in case of an axis element, multiple data points) (818). For example, if the filtering gesture was performed on an individual data point, that point may be deleted; if the filtering gesture was performed on a category-label row, data is aggregated (i.e., summed or averaged) across categories associated with that label; and if the gesture was performed on a value range, data falling within that range is deleted. Following the filtering, the displayed data chart is re-rendered based on the updated active data set 742 (820).

In addition to updating the active data set 742 (i.e., the one being displayed), the filtering procedures may also cause the old data, i.e., the data set as it existed prior to filtering, or the filtered-out portion of the data set (herein referred to as "inactive"), to be stored (822). Multiple filtering actions may, thus, result in multiple stored inactive sets. Collectively, the inactive data sets are herein called the trash bin. If the user activates a recovery mode (824), e.g., by tapping a suitable symbol (as depicted, e.g., in FIG. 6A), an event listener associated with the displayed data chart may listen for a recovery gesture (which may be defined, e.g., as a hold-and-swipe gesture to the left). Upon performance of the recovery gesture by the user (828) and detection of the gesture by the event listener (830), the inactive data set may be recovered (832). For example, if the inactive data set includes the complete data set prior to a particular filtering action, it may simply be used to replace the existing active data set, and deleted from the trash bin. Alternatively, if the inactive data set includes only the filtered-out portion of the data, such data may be recombined with the active data set to reverse the previous filtering action. Following the reversal of a previous filtering action and recovery of the old data, the updated active data set may again be charted (834).

A particular implementation example is now described in more detail. Underlying this example is the assumption that the data is initially provided in the form of a table as depicted in FIG. 9A, where each row (except for the title row) corresponds to a different data point and each column corresponds to a type of category or a value axis. For instance, a table with four columns, as shown, may contain data that is categorized in three dimensions, with a fourth column listing the value for the respective combination of categories. FIG. 9B further illustrates this data structure for a concrete data set with three category dimensions (corresponding to country, year, and product) and a value dimension specifying the revenue.

Figure 9E:
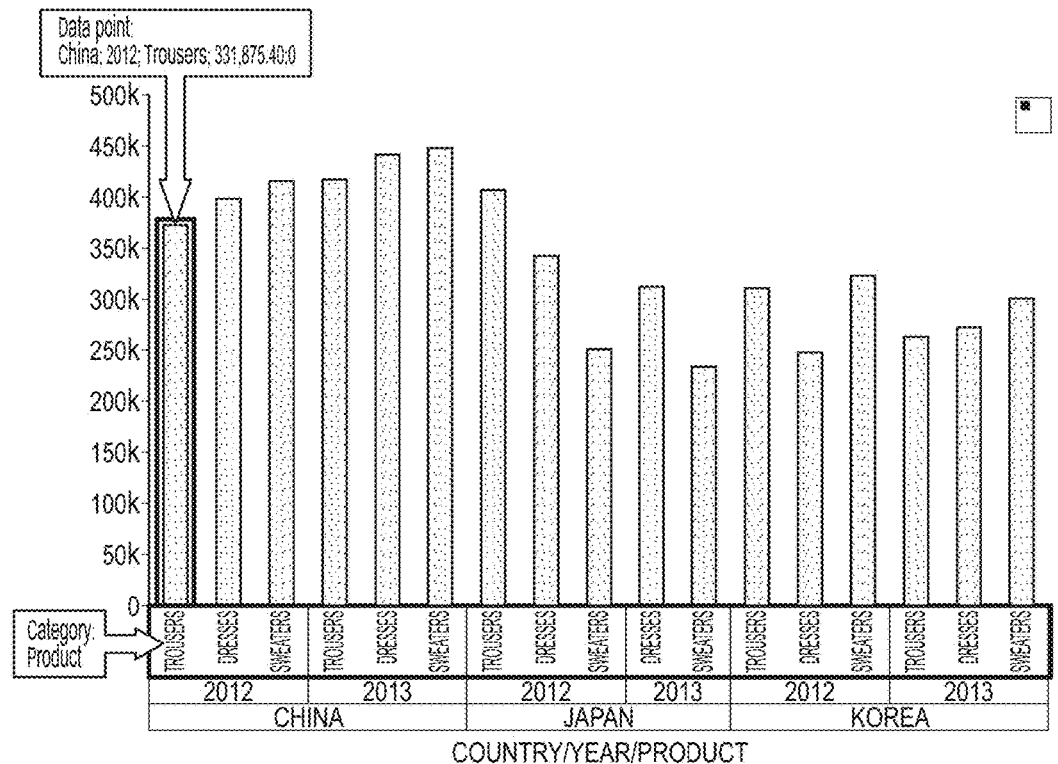
FIG. 9E illustrates the binding of contexts as defined in FIGS. 9C and 9D to the screen objects of a displayed data chart in accordance with some embodiments.

In some embodiments, the data is processed (804) to create a "context" for each data point, value axis, and category-label row to be displayed. As shown in FIGS. 9C and 9D, the processing may result in two tables: a first table storing all individual data points as before and adding a column that specifies the context, i.e., a unique identifier, for each point (FIG. 9C), and a second table storing, as respective category contexts, the names of all category types (i.e., one for each label row) as well as the value dimension (FIG. 9D) (which is herein also considered a type of category). These contexts are then bound to the screen objects as shown in FIG. 9E, i.e., data-point contexts are bound to the elements of the graph (e.g., an individual bar) and category contexts are bound to the axes.

Figure 10:
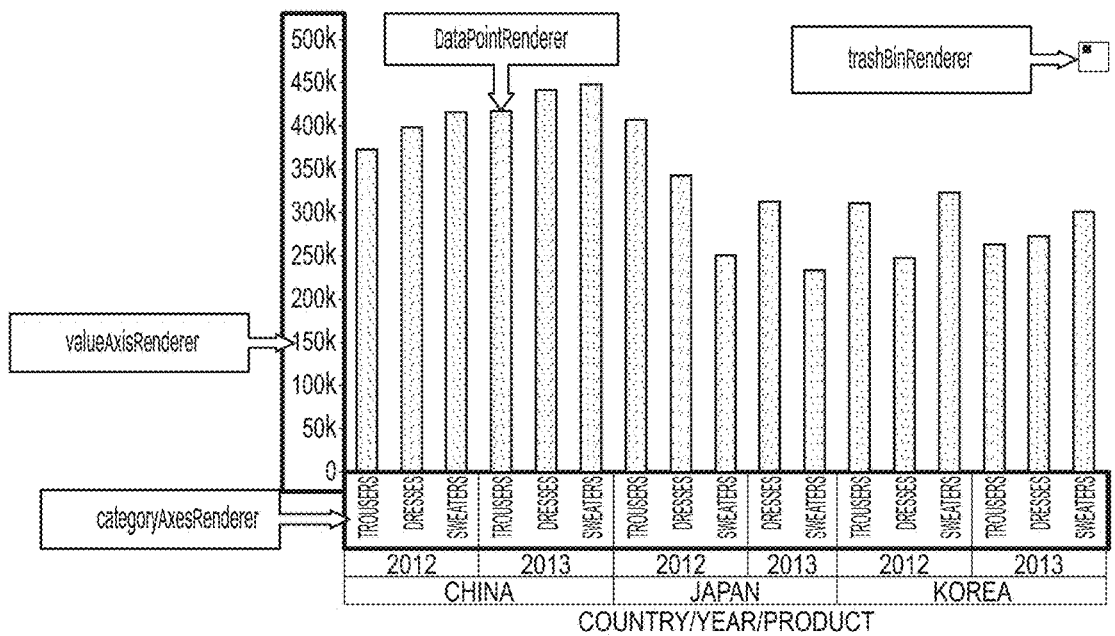
FIG. 10 illustrates rendering functions associated with various screen objects of a data chart in accordance with some embodiments.

Furthermore, the filtering functions contemplated herein, which are triggered by well-defined gesture-based events, are bound to the screen objects. In some embodiments, four types of events are defined: data-point filter events, value-axis filter events, category-axis filter events, and data-recovery events. Each type of event is handled by a dedicated event handler, e.g., a filtering procedure specific to that event. The events and associated event handlers may be bound to the rendering procedures (which may be part of the charting module 734) for the respective screen objects, which are illustrated in FIG. 10. Then, whenever the user executes a defined filtering gesture on an appropriate screen object, the corresponding filter event is dispatched to the event handler, along with suitable parameters. These parameters include, for data-point, category, and value-axis filter events, the context bound to the screen object to which the gesture was applied (or a location of such context within the data table). For value-axis filter events, two additional parameters are typically provided to signify the minimum and maximum values of the selected value range. In trash-bin view, a data-recovery event may be dispatched without the need for specifying any parameters.

With reference to FIGS. 9C and 11, when the user "swipes out" a data point (e.g., by performing a hold-and-swipe gesture as defined above), such as, for instance, the data point with context 11 (see FIG. 9C), the event listener associated with the rendering procedure for that data point may dispatch a data-point filter event message with the data-context parameter {row:12,column:4}. The data-point filtering procedure then filters the data set by this data context, resulting in the updated data set shown in FIG. 11, from which previous row 12 is missing. The old data set may be pushed into the trash bin, and the chart may be updated based on the new data set.

With reference to FIGS. 9C, 12A and 12B, when the user swipes out a category, such as, for instance, the year category (see FIG. 9C), the event listener associated with the rendering procedure for that category may dispatch a category filter event message with the parameter {category: 'year'}. The category filtering procedure then aggregates the data by year, resulting in the updated data set shown in FIG. 12A, which now has only three category/value columns, and the updated category axis shown in FIG. 12B, which now includes only two category-label rows.

Figures 13A, 13B:
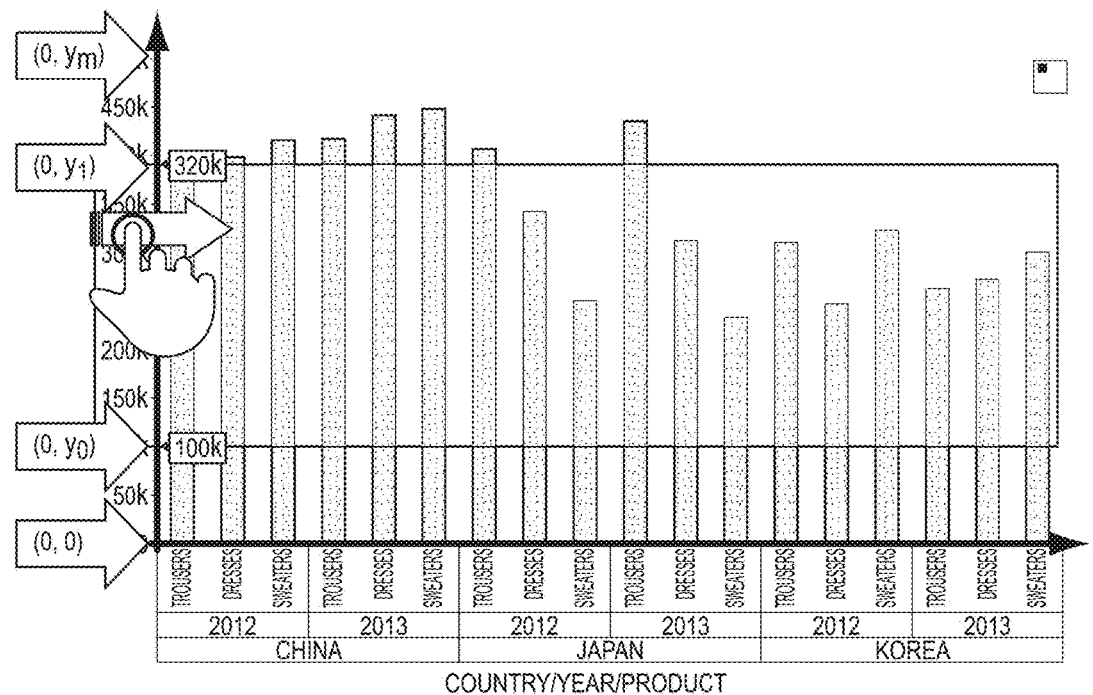
FIG. 13A illustrates the definition of a value range in the context of value-range-based filtering in accordance with some embodiments.
FIG. 13B illustrates the data set of FIG. 9B following value-range-based filtering as depicted in FIG. 13A in accordance with some embodiments.

Data-range filtering may involve multiple sub-events triggered by the different parts of the composite filtering gesture. For example, when the event listener associated with the value axis detects a long-press event on the value axis (e.g., by 500 ms or more), it may dispatch an event message to a value-range procedure that causes display of a value-range editor (e.g., as shown in FIG. 4B) on the screen. The value-range editor itself may have an associated event listener that listens for range-adjustment events. The value-range editor may, for example, take the form of a horizontal band overlaid on the chart, which may be shifted up or down, or adjusted in width, with two fingers. The selected value range may initially be defined in terms of the pixels on-screen. For example, as illustrated in FIG. 13A, the pixel coordinates, along a vertical value axis, of the axis origin (i.e., intersection with the category axis), lower boundary of the selected value range, upper boundary of the selected value range, and upper boundary of the value axis, respectively, may be (0,0), (0,$y_0$), (0, $y_1$), and (0, $y_m$). Denoting the values associated with the origin and upper axis boundaries with L and U, respectively, the upper and lower values l, u associated with the selected value range can be calculated from the pixel coordinates as follows:

$$l = L + (U-L) \cdot y_0/y_m$$

$$u = U + (U-L) \cdot y_1/y_m$$

Upon detection of a swipe-out gesture on the selected value range, a value-axis filter event message including the value-axis context {category:'Revenue'} and the computed boundaries of the value range, l and u, as parameters may be dispatched. Based on these parameters, the data-point contexts for data points falling within the selected value range may be determined, and the data set may be updated based thereon. The resulting data set is shown in FIG. 13B.

Figure 14A:
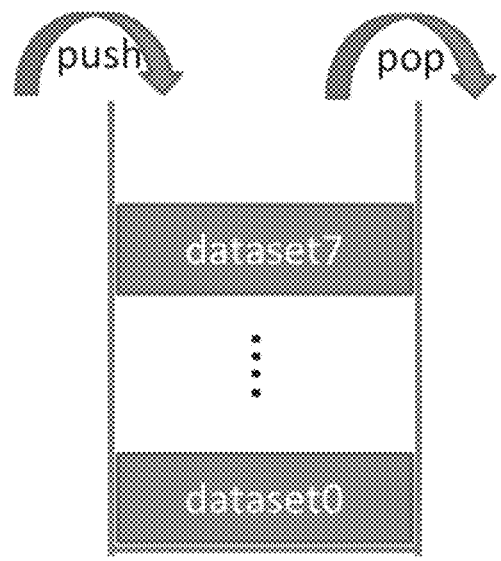
FIGS. 14A-14D illustrate an exemplary data structure for storing and retrieving data sets in accordance with some embodiments.
Figure 14B:
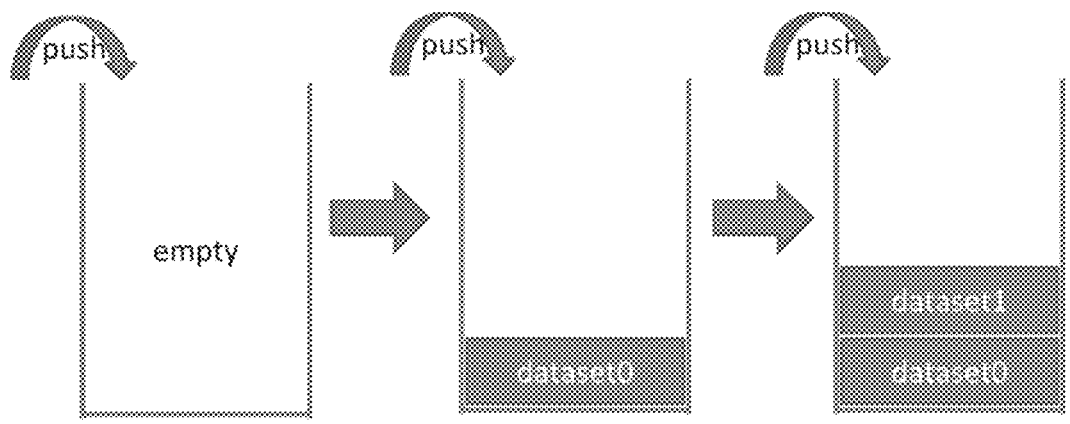
Figure 14C:
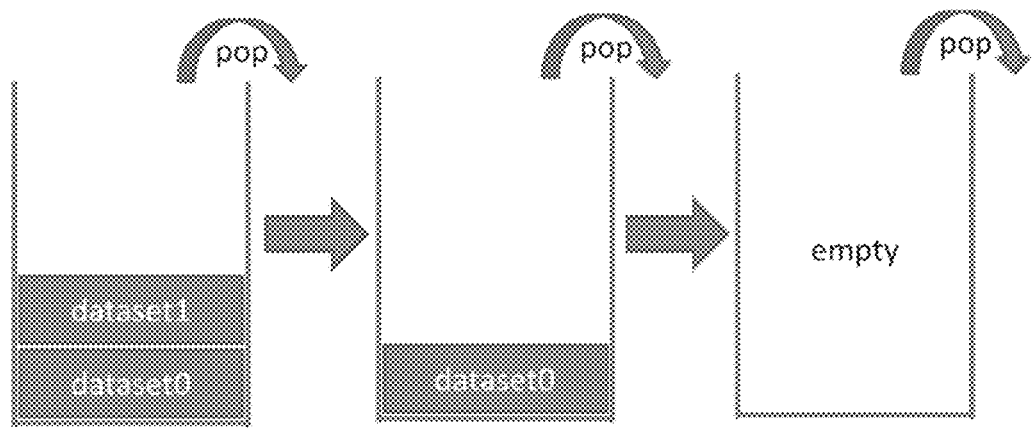
Figure 14D:
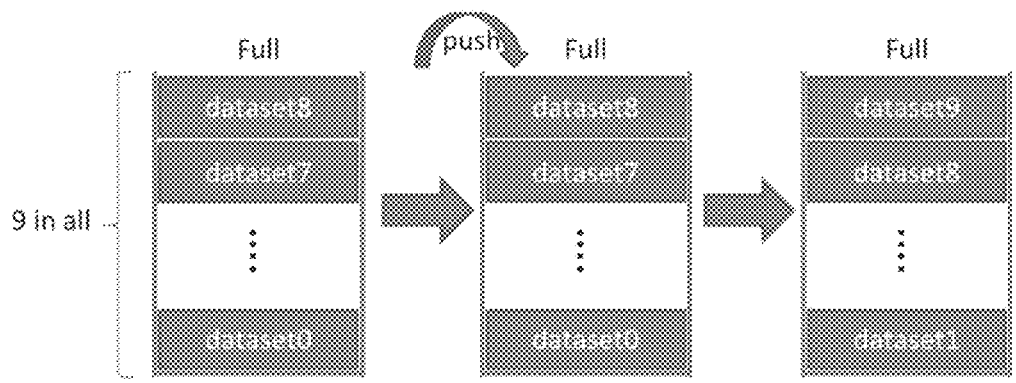

In some embodiments, as mentioned above, filtered-out data can be recovered from a trash-bin, i.e., a repository of the previous data sets or filtered-out portions thereof. For this purpose, an event listener that listens for a recovery gesture (e.g., a "swipe-back" gesture corresponding to a hold-and-swipe gesture in the opposite direction as is used for filtering) may be used. When such a recovery gesture is performed, e.g., anywhere on the charting canvas, an event message restoring the data set prior to the filtering action may be dispatched. FIGS. 14A-14D illustrate the data structure of the trash bin in accordance with one example embodiment. Herein, the trash bin takes the form of a stack to which a new data set can only be added from the top (corresponding to a "push" action, see FIG. 14A) and from which only the top data set at any given time can be removed (corresponding to a "pop" action). Thus, as successive filtering actions are performed, the initially empty data stack is filled one by one, as shown in FIG. 14B. Conversely, as successive recovery actions are performed, data sets are removed one by one, as shown in FIG. 14C, until the stack is empty again. The capacity of the stack may be limited, e.g., to a maximum of nine data sets. If, in this case, a tenth data set (set number 9) is pushed into the trash bin, the first-stored data set (set number 0) may be deleted to make room for the recording of the most recent set; this is illustrated in FIG. 14D. Of course, different data structures may be implemented to provide functionality to reverse filtering actions.

While various specific embodiments are described herein, these embodiments are intended to be illustrative only, rather than limiting. For example, different types of gestures than described herein may be employed for on-chart filtering in accordance herewith, and implementation details of systems providing the filtering functionality described herein may vary. It will be appreciated that many variations, modifications, and additions are possible without departing from the scope of embodiments of the present disclosure.

What is claimed is:

1. A method comprising:
    causing, by one or more processors of a machine, display of a two-dimensional-axes data chart in a graphical user interface (GUI), the two-dimensional-axes data chart comprising, along a category axis, a plurality of category-label rows each indicating a different corresponding plurality of categories;
    detecting, by one or more processors of the machine, a selecting gesture that includes a touching of or click on one of the displayed category-label rows in the GUI, whereby that category-label row is selected, the selected category-label row indicating a selected plurality of categories distinct from a non-selected plurality of categories indicated by a non-selected category-label row;
    detecting, by one or more processors of the machine, a filtering gesture that includes a touching of or click on the selected category-label row in the GUI followed by a swipe on the selected category-label row in the GUI, the detected filtering gesture indicating that the selected plurality of categories are not of interest; and
    generating, by one or more processors of the machine and in response to the detected filtering gesture, and causing display of an interest-improved version of the two-dimensional-axes data chart in the GUI by executing a rendering procedure that corresponds to the selected category-label row, the rendering procedure calculating a corresponding representative value for each of the non-selected plurality of categories uninfluenced by the selected plurality of categories and generating the interest-improved version of the two-dimensional-axes data chart, the interest-improved version omitting the selected category-label row and depicting the calculated representative values for the non-selected plurality of categories indicated by the non-selected category-label row, the omitting of the selected category-label row indicating that the selected plurality of categories are not of interest and did not influence the calculating of the representative values for the non-selected plurality of categories.

2. The method of claim 1, further comprising detecting an additional filtering gesture that includes a touching of or click on a value range of the two-dimensional-axes data chart.

3. The method of claim 2, further comprising, in response to the additional filtering gesture, deleting data associated with the value range.

4. The method of claim 2, wherein the additional filtering gesture is a composite gesture comprising a first gesture part selecting a value axis, a second gesture part defining the value range, and a third gesture part performed on the defined value range.

5. The method of claim 1, wherein the filtering gesture comprises a touch-based gesture.

6. The method of claim 1, further comprising storing filtered-out data that corresponds to the omitted category-label row.

7. The method of claim 6, further comprising, upon detection of a recovery gesture performed on the two-dimensional-axes data chart, restoring the filtered-out data to the two-dimensional-axes data chart.

8. The method of claim 7, wherein the filtering gesture comprises a hold-and-swipe gesture performed to the right and wherein the recovery gesture comprises a hold-and-swipe gesture performed to the left.

9. A system comprising:
    a hardware processor; and
    memory storing instructions that, when executed by the hardware processor, cause the hardware processor to perform operations comprising:

causing display of a two-dimensional-axes data chart in a graphical user interface (GUI), the two-dimensional-axes data chart comprising, along a category axis, a plurality of category-labeled rows each indicating a different corresponding plurality of categories;

detecting a selecting gesture that includes a touching of or click on one of the displayed category-label rows in the GUI, whereby that category-label row is selected, the selected category-label row indicating a selected plurality of categories distinct from a non-selected plurality of categories indicated by non-selected category-label row;

detecting a filtering gesture that includes a touching of or click on the selected category-label row in the GUI followed by a swipe on the selected category-label row in the GUI, the detected filtering gesture indicating that the selected plurality of categories are not of interest; and in response to the detected filtering gesture, generating and causing display of an interest-improved version of the two-dimensional-axes data chart in the GUI by executing a rendering procedure that corresponds to the selected category-label row, the rendering procedure calculating a corresponding representative value for each of the non-selected plurality of categories uninfluenced by the selected plurality of categories and generating the interest-improved version of the two-dimensional-axes data chart, the interest-improved version omitting the selected category-label row and depicting the calculated representative values for the non-selected plurality of categories indicated by the non-selected category-label row, the omitting of the selected category-label row indicating that the selected plurality of categories are not of interest and did not influence the calculating of the representative values for the non-selected plurality of categories.

10. The system of claim 9, further comprising a touch screen and wherein the filtering gesture comprises a touch-based gesture.

11. The system of claim 9, wherein the memory further stores at least one inactive data set comprising filtered data.

12. The system of claim 11, wherein the instructions further comprise instructions which, when executed by the hardware processor, cause the hardware processor to restore one of the at least one inactive data sets in response to a recovery gesture performed on the two-dimensional-axes data chart.

13. The system of claim 9, wherein the instructions further comprise instructions which, when executed by the hardware processor, cause the hardware processor to detect a further filtering gesture performed on a value range, and to filter a data set that corresponds to the two-dementia-axes data chart by deleting data associated with the value range.

14. A non-transitory computer-readable medium storing processor-executable instructions which, when executed by a hardware processor, cause the hardware processor to perform operations comprising:

causing display of a two-dimensional-axes data chart in a graphical user interface (GUI), the two-dimensional-axes data chart comprising, along a category axis, a plurality of category-labeled rows each indicating a different corresponding plurality of categories;

detecting a selecting gesture that includes a touching of or click on one of the displayed category-label rows in the GUI, whereby that category-label row is selected, the selected category-label row indicating a selected plurality of categories distinct from a non-selected plurality of categories indicated by non-selected category-label row;

detecting a filtering gesture that includes a touching of or click on the selected category-label row in the GUI followed by a swipe on the selected category-label row in the GUI, the detected filtering gesture indicating that the selected plurality of categories are not of interest; and in response to the detected filtering gesture, generating and causing display of an interest-improved version of the two-dimensional-axes data chart in the GUI by executing a rendering procedure that corresponds to the selected category-label row, the rendering procedure calculating a corresponding representative value for each of the non-selected plurality of categories uninfluenced by the selected plurality of categories and generating the interest-improved version of the two-dimensional-axes data chart, the interest-improved version omitting the selected category-label row and depicting the calculated representative values for the non-selected plurality of categories indicated by the non-selected category-label row, the omitting of the selected category-label row indicating that the selected plurality of categories are not of interest and did not influence the calculating of the representative values for the non-selected plurality of categories.

\* \* \* \* \*